(12) United States Patent
Lee

(10) Patent No.: US 8,804,088 B2
(45) Date of Patent: Aug. 12, 2014

(54) BACKLIGHT UNIT AND LIQUID CRYSTAL DISPLAY DEVICE HAVING THE SAME

(75) Inventor: Ah-Ram Lee, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 220 days.

(21) Appl. No.: 12/845,462

(22) Filed: Jul. 28, 2010

(65) Prior Publication Data
US 2011/0141397 A1 Jun. 16, 2011

(30) Foreign Application Priority Data
Dec. 16, 2009 (KR) .................. 10-2009-0125510

(51) Int. Cl.
*G02F 1/1345* (2006.01)

(52) U.S. Cl.
USPC ............... 349/150; 349/62; 349/61; 362/631

(58) Field of Classification Search
USPC ............ 349/61–71, 149–152; 362/600, 631
See application file for complete search history.

(56) References Cited

U.S. PATENT DOCUMENTS

| | | | |
|---|---|---|---|
| 7,796,214 B2* | 9/2010 | Tsai et al. | 349/65 |
| 8,403,548 B2* | 3/2013 | Kim et al. | 362/606 |
| 2008/0002099 A1* | 1/2008 | Oh | 349/65 |
| 2008/0043171 A1* | 2/2008 | Takahashi et al. | 349/65 |
| 2008/0170179 A1* | 7/2008 | Shiraishi | 349/65 |
| 2009/0073347 A1* | 3/2009 | Takahashi et al. | 349/65 |
| 2009/0213619 A1* | 8/2009 | Nakamoto et al. | 362/621 |
| 2009/0231297 A1* | 9/2009 | Hatakeyama | 345/173 |
| 2009/0237592 A1* | 9/2009 | Mizutani | 349/62 |
| 2010/0328580 A1* | 12/2010 | Kim | 349/64 |

FOREIGN PATENT DOCUMENTS

| | | | | |
|---|---|---|---|---|
| CN | 1506733 A | | 6/2004 | |
| CN | 101149497 A | | 3/2008 | |
| CN | 101354497 A | | 1/2009 | |
| JP | 2006093015 | * | 4/2006 | ............... F21V 8/00 |
| JP | 2006-236641 | * | 9/2006 | ............... F21V 8/00 |
| JP | 2008077040 A | | 4/2008 | |
| JP | 2008242108 A | | 10/2008 | |
| JP | 2009081014 | * | 4/2009 | ............... F21V 8/00 |
| KR | 1020050078725 | | 8/2005 | |
| KR | 10-2008-0001753 A | | 1/2008 | |
| KR | 1020080012613 | | 2/2008 | |
| KR | 1020080051485 | | 6/2008 | |
| KR | 10-2008-0084334 A | | 9/2008 | |
| KR | 1020080085590 | | 9/2008 | |
| KR | 1020090000374 | * | 1/2009 | ............ G02F 1/3357 |
| KR | 1020090043799 | | 5/2009 | |

* cited by examiner

*Primary Examiner* — Edward J. Glick
*Assistant Examiner* — Anthony G Quash
(74) *Attorney, Agent, or Firm* — Robert E. Bushnell, Esq.

(57) ABSTRACT

A backlight unit is provided. The backlight unit includes: a mold frame having a predetermined receiving space formed therein; a light guide plate disposed in the receiving space of the mold frame, and having an inclined surface formed on one side of the top surface so as to be inclined toward the inner side; a light source disposed between the light guide plate and the mold frame to emit light to the light guide plate; and a flexible printed circuit board, on which the light source is mounted, and which is supported in contact with the top surface of the light guide plate, wherein a stepped portion is formed on one end of the light guide plate, including a flat adhesion surface positioned at a height lower than one end face of the light guide plate.

18 Claims, 5 Drawing Sheets

BACKLIGHT UNIT AND LIQUID CRYSTAL DISPLAY DEVICE HAVING THE SAME

RELATED APPLICATION

This application claims priority to and the benefit of Korean Patent Application No. 10-2009-0125510 filed in the Korean Intellectual Property Office on Dec. 16, 2009, the entire contents of which are incorporated herein by reference.

BACKGROUND OF THE INVENTION

1. Field of the Invention

The present invention relates to a liquid crystal display device, and more particularly, to a backlight unit having a light guide plate structure capable of preventing light leakage from a light source and a liquid crystal display device having the same.

2. Description of Related Art

Since liquid crystal display devices have the advantages of small size, light weight, and larger screen compared to cathode ray tubes, the development of liquid crystal display devices has been actively conducted, and the application range of the liquid crystal display devices has been rapidly spreading. Liquid crystal display devices are used in laptop computers, monitors for desktop computers, large display devices, and mobile communication devices.

Such a liquid crystal display device displays desired images by controlling the quantity of transmitted light according to image signals applied to a plurality of control switches arranged in a matrix form, and comprises an LCD panel on which images are directly displayed, an LCD driving circuit for operating the LCD panel, and a backlight unit used as a light source of the liquid crystal display device.

As small and medium sized liquid crystal display devices have been rapidly made thinner in recent years, a method of designing a light guide plate of a backlight unit so as to be at an inclination is frequently employed as a means of reducing the thickness of the backlight unit.

That is, one side serving as an incident portion of the light guide plate is formed thick corresponding to the minimum thickness of a light emitting diode (LED) used as a light source of the backlight unit, and a portion corresponding to an active area of the LCD panel is formed thinner than the one side serving as the incident portion of the light guide plate, considering the thickness of an optical sheet placed on the upper end.

At this point, a flexible printed circuit board for supporting an LED light source is supported by the light guide plate as its one end is adhered to an inclined surface of the light guide plate.

As such, the portion of the flexible printed circuit board adhered to the light guide plate is not a flat surface but an inclined surface. Thus, if the flexible printed circuit board having elastic force is adhered to the inclined surface of the light guide plate while being bent, the flexible printed circuit board may come off the inclined surface by its elastic force.

When the flexible printed circuit board comes off the inclined surface, there arises the problem of leakage of light generated from the LED light source through a space formed between the flexible printed circuit board and the inclined surface.

Meanwhile, the flexible printed circuit board is adhered to the light guide plate by an adhesive tape, and the adhesive tape is made of a transparent material and has a predetermined thickness. Thus, the liquid crystal display device according to the conventional art has the problem of light leakage because light coming from the LED light source can leak to an upper part of the light guide plate through the inside of the adhesive tape.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to overcome the aforementioned problems and to provide a backlight unit capable of preventing light leakage between a light guide plate and a flexible printed circuit board.

According to one aspect of the present invention, there is provided a backlight unit including: a mold frame having a predetermined receiving space formed therein; a light guide plate disposed in the receiving space of the mold frame, and having an inclined surface formed on one side of the top surface so as to be inclined toward the inner side; a light source disposed between the light guide plate and the mold frame to emit light to the light guide plate; and a flexible printed circuit board, on which the light source is mounted, and which is supported in contact with the top surface of the light guide plate, wherein a stepped portion is formed on one end of the light guide plate, including a flat adhesion surface positioned at a height lower than one end face of the light guide plate positioned at the front of the light source such that an adhesive for adhering the flexible printed circuit board to the light guide plate is positioned thereon.

The height of the one end face of the light guide plate positioned at the front of the light source may be greater than the height of the light source.

The difference between the height of the one end face of the light guide plate positioned at the front of the light source and the height of the light source may be approximately equal to the thickness of a connection portion for mounting the light source on the flexible printed circuit.

The light source may consist of a plurality of light sources arranged at predetermined intervals.

The stepped portion may be positioned between the plurality of light sources.

The adhesive may be an adhesive tape.

The height difference between the flat adhesion surface and the one end face of the light guide plate may be approximately equal to the height of the adhesive tape.

An upper flat surface may be formed between the inclined surface and the one end face of the light guide plate.

The flexible printed circuit board may be formed to be in contact with the upper flat surface.

An end of the flexible printed circuit board may be positioned on the upper flat surface.

The backlight unit may further include a diffusion sheet having one side of the bottom surface contacting the top surface of the light guide plate and the other side of the bottom surface positioned on the flexible printed circuit board to cover the inclined surface.

A printed surface for blocking light emitted from the light source and transmitted through the diffusion sheet may be formed on the inclined surface of the diffusion sheet.

According to another aspect of the present invention, there is provided a liquid crystal display device including: a mold frame having a predetermined receiving space formed therein;

a light guide plate disposed in the receiving space of the mold frame, and having an inclined surface formed on one side of the top surface so as to be inclined toward the inner side; a light source disposed between the light guide plate and the mold frame to emit light to the light guide plate; a flexible printed circuit board, on which the light source is mounted, and which is supported in contact with the top surface of the light guide plate; and a liquid crystal display panel disposed on top of the light guide plate to display an image, wherein a stepped portion is formed on one end of the light guide plate, including a flat adhesion surface positioned at a height lower than one end face of the light guide plate positioned at the front of the light source such that an adhesive for adhering the flexible printed circuit board to the light guide plate is positioned thereon.

According to one exemplary embodiment of the present invention, light leakage to the front of the light source can be prevented while making the flexible printed circuit board tightly fitted to the light guide plate by forming the stepped portion on which an adhesive for adhering the flexible printed circuit board to the light guide plate is disposed.

Moreover, light leakage can be prevented by forming the diffusion sheet covering the inclined surface on the inclined surface of the light guide plate to diffuse light exiting through the inclined surface.

Furthermore, it is possible to prevent light from passing through the diffusion sheet by forming the black printed surface on the inclined surface on the upper side of the diffusion sheet, thereby completely blocking light leakage between the light guide plate and the flexible printed circuit board.

Figure 1:
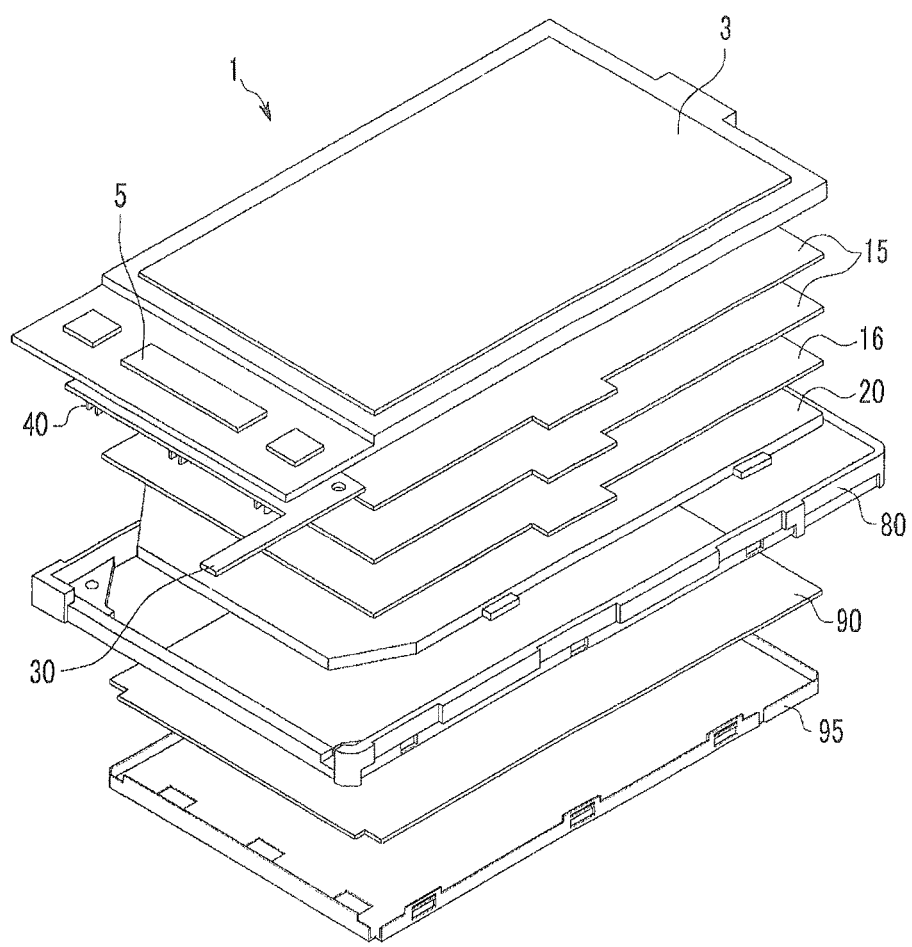
FIG. 1 is an exploded perspective view of a liquid crystal display device according to one exemplary embodiment of the present invention.

DESCRIPTION OF REFERENCE NUMERALS INDICATING PRIMARY ELEMENTS IN THE DRAWINGS 1 liquid crystal display (LCD) 3 LCD panel
10 backlight unit 20 light guide plate
30 flexible printed circuit (FPC) 40 LED
50 adhesive tape 60 diffusion sheet
70 printed surface 80 mold frame
90 reflection plate 95 chassis

DETAILED DESCRIPTION OF THE INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

FIG. 1 is an exploded perspective view of a liquid crystal display device according to one exemplary embodiment of the present invention.

Referring to FIG. 1, a liquid crystal display device 1 according to one exemplary embodiment of the present invention comprises an LCD panel 3, an LCD driving IC 5, a flexible printed circuit board (FPC) 30, a plurality of light sources 40, a plurality of prism sheets 15, a diffusion plate 16, a light guide plate 20, a mold frame 80, a reflection plate 90, and a chassis 95.

The LCD panel 3 comprises a color filter substrate and a thin film transistor (TFT) substrate.

The LCD driving IC 5 is mounted on the LCD panel 3, and applies predetermined gate signals to gate lines of the TFT substrate and applies predetermined data signals to data lines of the TFT substrate.

The plurality of light sources 40 may be LED light sources, and are mounted on the flexible printed circuit 30.

The light guide plate 20 converts light generated from the plurality of light sources into light having an optical distribution in the form of a surface light source.

A plate having high light reflectivity is used as the reflection plate 90 and is installed to be in contact with a floor surface of the chassis 95.

The plurality of prism sheets 15 and the diffusion plate 16 are disposed on top of the light guide plate 20 such that uniform luminance distribution of light exiting from the light guide plate 20 may be obtained.

In the liquid crystal display device according to one exemplary embodiment of the present invention, a stepped portion where an adhesive tape is positioned thereon is provided on the light guide plate forming the backlight unit in order to prevent the light generated from the plurality of light sources from leaking through a gap between the light guide plate and the flexible printed circuit board. Hereinafter, the backlight unit of the liquid crystal display device according to one exemplary embodiment of the present invention will be described in more detail with reference to other drawings.

Figure 2:
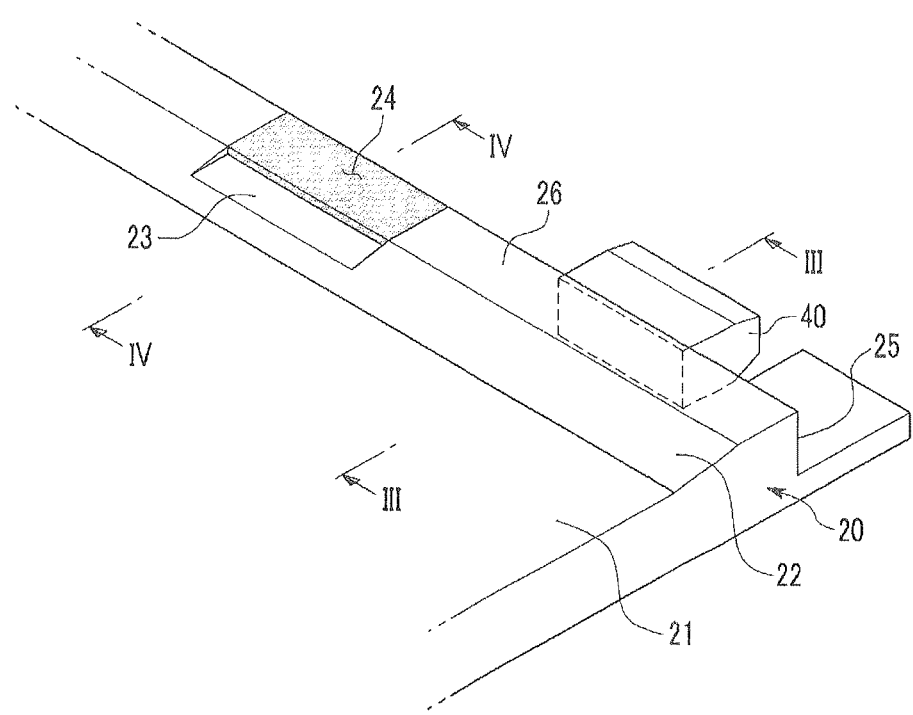
FIG. 2 is a partial configuration diagram of a backlight unit according to one exemplary embodiment of the present invention, which shows a perspective view of a light guide plate and a plurality of light sources.
Figure 3:
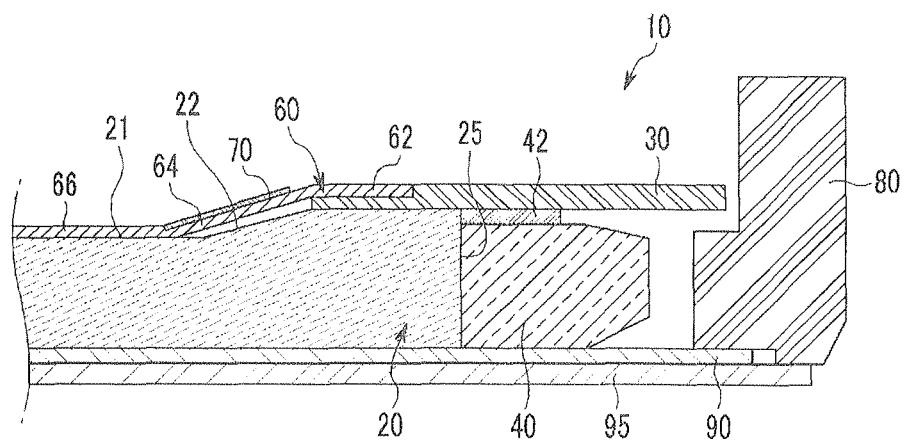
FIG. 3 is a cross-sectional view of the backlight unit according to one exemplary embodiment of the present invention, which shows a cross-sectional view taken along line III-III of FIG. 2.
Figure 4:
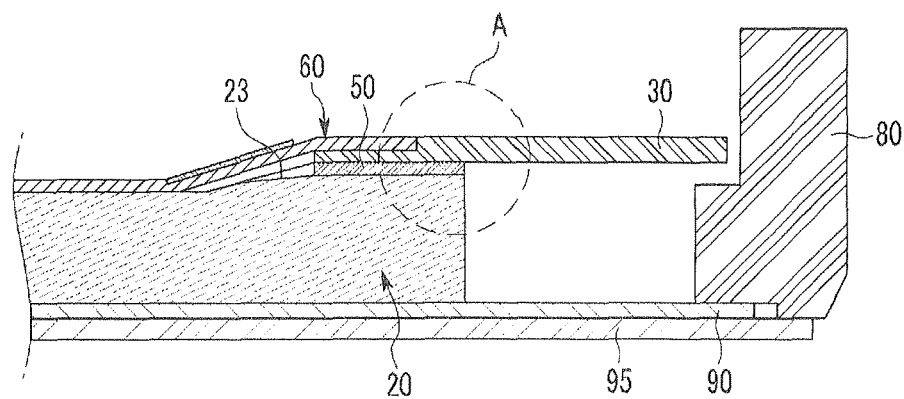
FIG. 4 is a cross-sectional view of the backlight unit according to one exemplary embodiment of the present invention, which shows a cross-sectional view taken along line IV-IV.
Figure 5:
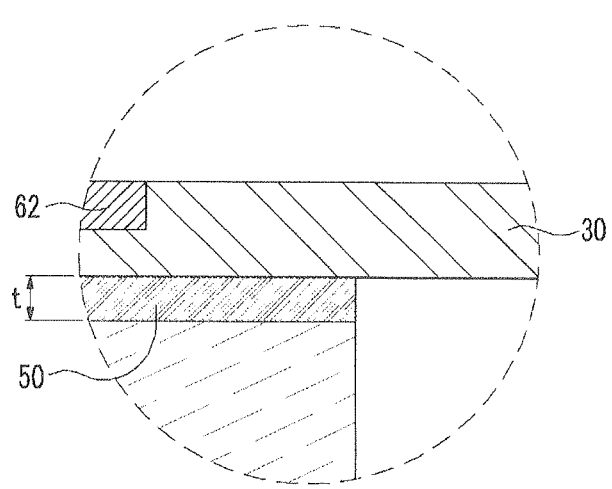
FIG. 5 is an enlarged view of portion A of FIG. 4.
Figure 6:
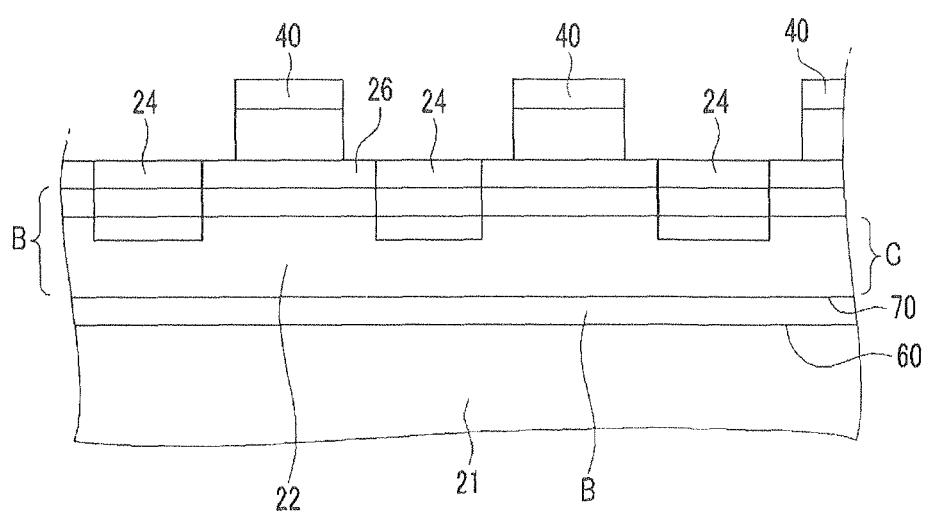
FIG. 6 is a partial top plan view of FIG. 2 as viewed from above.

FIG. 2 is a partial configuration diagram of a backlight unit 10 according to one exemplary embodiment of the present invention, which shows a perspective view of a light guide plate and a plurality of light sources. FIG. 3 is a cross-sectional view taken along line III-III. FIG. 4 is a cross-sectional view taken along line IV-IV. FIG. 5 is an enlarged view of portion A of FIG. 4. FIG. 6 is a partial top plan view of FIG. 2 as viewed from above. In FIGS. 2 and 6, the illustration of the components other than the light guide plate and the plurality of light sources is omitted for convenience of explanation.

Referring to FIGS. 2 to 6, a backlight unit 10 provided in the liquid crystal display device according to one exemplary embodiment of the present invention comprises a mold frame 80, a light guide plate 20, a plurality of light sources 40, and a flexible printed circuit board 30.

The mold frame 80 has a predetermined receiving space formed therein, and the light guide plate 20 and the plurality of prism light sources 40 are positioned in the receiving space in the mold frame 80.

The light guide plate 20 is disposed inside the mold frame 80, and one end thereof is formed to have an inclined surface 22.

Accordingly, referring to FIGS. 2 and 3, the light guide plate 20 is formed such that one end face 25 adjacent to the plurality of light sources 40 has the largest thickness, and the light guide plate 20 has the inclined surface 22 which becomes thinner toward the inside from the one end face 25 and an inner flat surface 21 having the smallest thickness formed on the inside.

In the backlight unit according to one exemplary embodiment of the present invention, the light guide plate 20 is provided with a stepped portion 24 on which an adhesive is positioned for adhering the flexible printed circuit board 30 to the one end face 25 adjacent to the plurality of light sources 40 and having the largest thickness. A more detailed description thereof will be made later.

Meanwhile, the flexible printed circuit board 30 is formed between the light guide plate 20 and the mold frame 80 so as to be supported by an upper flat surface 26 of the light guide plate 20.

Referring to FIG. 3, a plurality of light sources are mounted below the flexible printed circuit (FPC) 30 by a connection method such as soldering. Accordingly, a solder connection portion 42 is formed between the light source 40 and the flexible printed circuit board 30.

In this exemplary embodiment, the plurality of light sources 40 are formed as a plurality of LED light sources. The plurality of LED light sources are installed in a space between the light guide plate 20 and the mold frame 80, being spaced apart from each other at predetermined intervals. However, the plurality of light sources are not limited thereto.

Meanwhile, the reflection plate 90 and the chassis 95 are positioned under the light guide plate 20 and the mold frame 80.

Accordingly, light from the plurality of light sources 40 passes through the light guide plate 20 and is emitted upward from an LED panel (not shown) disposed on the upper side of the light guide plate 20.

Meanwhile, according to one exemplary embodiment of the present invention, as can be seen from FIG. 2, the stepped portion 24 is formed at one end of the light guide plate 20. The stepped portion 24 is an area on one end of the light guide plate 20 where a flat adhesion surface 23 having a height smaller than that of the upper flat surface 26 is formed.

At this point, the adhesive for bonding the flexible printed circuit board 30 to the light guide plate is positioned on the flat adhesion surface 23. In this exemplary embodiment, the adhesive is a double-sided adhesive tape 50.

Referring to FIG. 5, the height difference between the flat adhesion surface 23 and the upper flat surface 26 corresponds to the thickness (t) of the adhesive tape 50. Accordingly, if the flexible printed circuit board 30 is adhered onto the light guide plate 20 by the adhesive tape, they can be tightly fitted without any gap in a portion where the adhesive tape is not present, e.g., between the upper flat surface on which the plurality of light sources 40 are positioned and the flexible printed circuit board.

According to one exemplary embodiment of the present invention, the stepped portion 24 where the flat adhesion surface 23 is formed may be positioned between each of the plurality of light sources 40.

Therefore, bonding of the flexible printed circuit board 30 to the light guide plate 20 is achieved by attaching the adhesive tape 50 to a plurality of flat adhesion surfaces 23 and then fixing one side of the flexible printed circuit board 30 by the adhesive tape 50.

Referring again to FIG. 3, as can be seen from this exemplary embodiment, the flexible printed circuit board 30 is formed such that it does not extend to the inner surface of the light guide plate 20 where the inclined surface 22 of the light guide plate 20 is positioned.

As such, when the flexible printed circuit board 30 is attached to the light guide plate 20 by the adhesive tape 50 attached to the stepped portion 20 at spaced intervals, the flexible printed circuit board 30 can be attached to the light guide plate 20 without being bent because it does not extend to the inclined surface.

Meanwhile, according to this exemplary embodiment, the flexible printed circuit board 30 to be attached to the light guide plate 20 is tightly fitted to the upper flat surface 26 of the light guide plate 20 in the area where the LED light sources are positioned, without being adhered thereto by the adhesive tape 50.

Moreover, referring to FIG. 4, the one end face 25 of the light guide plate 20 adjacent to the LED light sources has a height greater than that of the plurality of light sources 40.

Therefore, the upper flat surface 26 of the light guide plate 20 where the plurality of light sources 40 are positioned, and the flexible printed circuit board 30 are tightly fitted, and the flexible printed circuit board 30 is adhered to the upper flat surface without being bent, thus keeping the flexible printed circuit board 30 from coming off by its elastic force. Accordingly, the liquid crystal display device according to one exemplary embodiment of the present invention can prevent light from the plurality of light sources 40 from being emitted out through a gap between the light guide plate 20 and the flexible printed circuit board 30.

Moreover, the liquid crystal display device according to one exemplary embodiment of the present invention is configured such that the adhesive tape is not positioned right in front of the plurality of light sources but disposed between each of the plurality of light sources, and the height of the one end face 25 of the light guide plate positioned right in front of the light sources is greater than that of the light sources. Therefore, the liquid crystal display device according to this exemplary embodiment is formed such that it is difficult for light from the plurality of light sources 40 to leak through the adhesive tape 40.

Meanwhile, according to one exemplary embodiment of the present invention, the diffusion sheet 60 is attached to the inclined surface of the light guide plate 20.

At this point, as can be seen in FIG. 3, a right end portion 62 extends to the upper side of the flexible printed circuit board 30, and a left end portion 66 is formed to cover the inner flat surface 21 of the light guide plate. A central portion 64 of the diffusion sheet 60 is positioned on the inclined surface 22.

Referring to FIGS. 3 and 6, in the area (area B) on which the diffusion sheet 60 is attached, even light coming directly from the LED light sources is diffused by the diffusion sheet 60, thereby significantly reducing the intensity of light leakage.

Meanwhile, according to one exemplary embodiment of the present invention, a black printed surface 70 is formed at a position on the upper side of the diffusion sheet 60 where the inclined surface of the light guide is formed.

Accordingly, in the area (area C) where the black printed surface 70 is formed, even if the light coming directly from the plurality of light sources passes through the diffusion sheet, the light can be completely blocked by the black printed surface 70.

More specifically, light incident on the light guide plate 20 can come out without being totally reflected, according to Snell's law, in the portion of the inclined surface of the light guide plate 20, and therefore even if the diffusion sheet 60 is positioned on the inclined surface 22, this does not reduce or eliminate hotspots.

Accordingly, in this exemplary embodiment, the black printed surface 70 is formed in the portion of the inclined surface 22 to completely block the light exiting from the inclined surface 22.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A backlight unit comprising:
   a mold frame comprising a predetermined receiving space;
   a light guide plate including a top surface and an end face disposed in the receiving space of the mold frame including: an inclined surface on the top surface that declines in the direction of light travel in the light guide plate;
   a light source disposed between the light guide plate and the mold frame that emits light into the end face of the light guide plate; and
   a flexible printed circuit board, which the light source is mounted below, and which is in contact with the top surface of the light guide plate,
   a light-transmitting diffusion sheet with a bottom surface having first, second, and third portions in which the first portion contacting the top surface of the light guide plate, the second portion having an inclined surface covering the inclined surface of the light guide plate, the third portion being a horizontal area portion disposed on and directly contacting the flexible printed circuit board;
   wherein a step portion is disposed at one end of the light guide plate including: a flat adhesion surface on the top surface of the light guide plate at a height lower than the end face of the light guide plate and an adhesive, for adhering the flexible printed circuit board to the light guide plate, disposed on the flat adhesion surface,
   wherein an upper flat surface is disposed between the inclined surface and the end face of the light guide plate, and
   wherein an end of the flexible printed circuit board is disposed on the upper flat surface without being bent and does not extend to the inclined surface of the light guide plate.

2. The backlight unit of claim 1, wherein the height of the end face of the light guide plate is greater than the height of the light source.

3. The backlight unit of claim 2, wherein the difference between the height of the end face of the light guide plate and the height of the light source is approximately equal to the thickness of a connection portion for mounting the light source below the flexible printed circuit.

4. The backlight unit of claim 1, wherein the backlight unit comprises a plurality of light sources arranged at predetermined intervals.

5. The backlight unit of claim 4, wherein step portions are positioned between the plurality of light sources.

6. The backlight unit of claim 1, wherein the adhesive is an adhesive tape.

7. The backlight unit of claim 6, wherein the height difference between the flat adhesion surface and the end face of the light guide plate is approximately equal to the height of the adhesive tape.

8. The backlight unit of claim 1, wherein the flexible printed circuit board is in contact with the upper flat surface.

9. The backlight unit of claim 1, wherein a printed surface for blocking light emitted from the light source and transmitted through the diffusion sheet is disposed on the diffusion sheet covering the inclined surface.

10. A liquid crystal display device comprising:
    a mold frame comprising a predetermined receiving space;
    a light guide plate including a top surface and an end face disposed in the receiving space of the mold frame including an inclined surface on the top surface that declines in the direction of light travel in the light guide plate;
    a light source disposed between the light guide plate and the mold frame that emits light into the end face of the light guide plate; and
    a flexible printed circuit board, which the light source is mounted below, and which is in contact with the top surface of the light guide plate; and
    a liquid crystal display panel disposed on top of the light guide plate to display an image,
    a light-transmitting diffusion sheet with a bottom surface having first, second, and third portions in which the first portion contacting the top surface of the light guide plate, the second portion having an inclined surface covering the inclined surface of the light guide plate, the third portion being a horizontal area portion disposed on and directly contacting the flexible printed circuit board;
    wherein a step portion is disposed at one end of the light guide plate including: a flat adhesion surface on the top surface of the light guide plate at a height lower than the end face of the light guide plate , with an adhesive, for adhering the flexible printed circuit board to the light guide plate, disposed thereon,
    wherein an upper flat surface is disposed between the inclined surface and the end face of the light guide plate, and
    wherein an end of the flexible printed circuit board is disposed on the upper flat surface without being bent and does not extend to the inclined surface of the light guide plate.

11. The liquid crystal display device of claim 10, wherein the height of the end face of the light guide plate is greater than the height of the light source.

12. The liquid crystal display device of claim 10, wherein the difference between the height of the end face of the light guide plate and the height of the light source is approximately equal to the thickness of a connection portion for mounting the light source below the flexible printed circuit.

13. The liquid crystal display device of claim 10, wherein the liquid crystal display device comprises a plurality of light sources arranged at predetermined intervals.

14. The liquid crystal display device of claim 13, wherein the step portions are disposed between the plurality of light sources.

15. The liquid crystal display device of claim 10, wherein the adhesive is an adhesive tape.

16. The liquid crystal display device of claim 15, wherein the height difference between the flat adhesion surface and the end face of the light guide plate is approximately equal to the height of the adhesive tape.

17. The liquid crystal display device of claim 10, wherein the flexible printed circuit board is in contact with the upper flat surface.

18. The liquid crystal display device of claim 10, wherein a printed surface for blocking light emitted from the light source and transmitted through the diffusion sheet is disposed on the portion of the diffusion sheet covering the inclined surface.

* * * * *